(12) United States Patent
Liu et al.

(10) Patent No.: US 11,947,091 B2
(45) Date of Patent: Apr. 2, 2024

(54) ZOOM LENS AND OPTICAL DEVICE HAVING THE SAME

(71) Applicant: ZHEJIANG DAHUA TECHNOLOGY CO., LTD., Zhejiang (CN)

(72) Inventors: Kai Liu, Hangzhou (CN); Faguan Lin, Hangzhou (CN); Hongxing Ding, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 58 days.

(21) Appl. No.: 17/456,582

(22) Filed: Nov. 25, 2021

(65) Prior Publication Data

US 2022/0082806 A1 Mar. 17, 2022

Related U.S. Application Data

(63) Continuation of application No. PCT/CN2019/104180, filed on Sep. 3, 2019.

(30) Foreign Application Priority Data

May 30, 2019 (CN) .......................... 201910462619.7

(51) Int. Cl.
*G02B 15/14* (2006.01)

(52) U.S. Cl.
CPC .................................. *G02B 15/145* (2019.08)

(58) Field of Classification Search
CPC .......... G02B 15/145; G02B 15/145125; G02B 15/16; G02B 27/1013
See application file for complete search history.

(56) References Cited

U.S. PATENT DOCUMENTS

| 2008/0212184 A1 | 9/2008 | Ohtake |
| 2011/0080650 A1 | 4/2011 | Nanba |

(Continued)

FOREIGN PATENT DOCUMENTS

| CN | 108008516 A | 5/2018 |
| CN | 108681037 A | 10/2018 |

(Continued)

OTHER PUBLICATIONS

The Extended European Search Report in European Application No. 19930454.4 dated May 6, 2022, 7 pages.

(Continued)

*Primary Examiner* — Jack Dinh
(74) *Attorney, Agent, or Firm* — METIS IP LLC (57) ABSTRACT

The present disclosure relates to zoom lenses and optical devices using the same. A zoom lens may include in order from an object side to an image side: a first lens group, a second lens group, a third lens group, a fourth lens group; and a fifth lens group. The zoom lens may satisfy the following conditions: $-2.28 \leq f_2/f_{w'} \leq -1.08$, and $0.15 \leq TTL/(BFL*f_{w'}) \leq 0.45$, wherein $f_2$ denotes a focal length of the second lens group, $f_{w'}$ denotes a focal length of the zoom lens at a wide angle end, TTL denotes a total track length of the zoom lens, and BFL denotes a back focal length of the zoom lens.

20 Claims, 4 Drawing Sheets

(56) References Cited

U.S. PATENT DOCUMENTS

| | | |
|---|---|---|
| 2011/0249172 A1 | 10/2011 | Miyazawa |
| 2012/0099208 A1 | 4/2012 | Peng et al. |
| 2013/0100335 A1 | 4/2013 | Nanba |
| 2013/0250435 A1 | 9/2013 | Hagiwara |
| 2014/0362452 A1 | 12/2014 | Obama |
| 2015/0316756 A1 | 11/2015 | Sanjo |
| 2018/0259754 A1 | 9/2018 | Miyagishima et al. |
| 2020/0045211 A1 | 2/2020 | Liu et al. |
| 2020/0201006 A1 | 6/2020 | Hu et al. |
| 2021/0215917 A1 | 7/2021 | Liu et al. |

FOREIGN PATENT DOCUMENTS

| | | | |
|---|---|---|---|
| JP | 2004317967 A | 11/2004 | |
| WO | WO-2019042452 A1 * | 3/2019 | ..... G02B 15/145129 |

OTHER PUBLICATIONS

International Search Report in PCT/CN2019/104180 dated Feb. 21, 2020, 5 pages.
Written Opinion in PCT/CN2019/104180 dated Feb. 21, 2020, 5 pages.

* cited by examiner

FIG. 4

ZOOM LENS AND OPTICAL DEVICE HAVING THE SAME

CROSS-REFERENCE TO RELATED APPLICATIONS

This application is a continuation of International Application No. PCT/CN2019/104180, filed on Sep. 3, 2019, which claims priority of Chinese Application No. 201910462619.7, filed on May 30, 2019, the contents of which are incorporated herein in its entirety by reference.

TECHNICAL FIELD

The present disclosure generally relates to optical imaging technology, and more particularly, to zoom lenses and optical devices using the same.

BACKGROUND

With the developments of video surveillance and surveillance cameras, zoom lenses become more and more popular due to superior adaptability to complicated scenarios with their variable focal lengths. Some existing prime lenses usually need a plurality of lens components, each of which is used for light of a different wavelength. The prime lenses, however, cannot adapt to complicated scenarios. Some existing zoom lenses usually have back focal lengths that are too short to split light. Still some existing zoom lenses have small target planes, small apertures, and/or poor photosensitivity. Thus, it is desirable to provide zoom lenses capable of splitting light with large apertures and large target plans.

SUMMARY

An aspect of the present disclosure introduces a zoom lens including, in order from an object side to an image side: a first lens group; a second lens group; a third lens group; a fourth lens group; and a fifth lens group; wherein the zoom lens may satisfy the following conditions:

$-2.28 \leq f_2/f_w \leq -1.08$ $0.15 \leq TTL/(BFL * f_{w'}) \leq 0.45$ wherein $f_2$ denotes a focal length of the second lens group, $f_{w'}$ denotes a focal length of the zoom lens at a wide angle end, TTL denotes a total track length of the zoom lens, and BFL denotes a back focal length of the zoom lens.

In some embodiments, positions of the first lens group, the third lens group, and the fifth lens group are fixed, and the second lens group and the fourth lens group are movable along an optical axis of the zoom lens.

In some embodiments, the first lens group may include, in order from the object side to the image side: a first lens having negative refractive power; a second lens having positive refractive power; and a first lens unit having positive refractive power.

In some embodiments, the first lens unit may include a third lens having positive refractive power.

In some embodiments, the second lens group may include, in order from the object side to the image side: a fourth lens having negative refractive power; a fifth lens having negative refractive power; and a second lens unit having positive refractive power.

In some embodiments, the second lens unit may include a lens having positive refractive power or a cemented lens having positive refractive power.

In some embodiments, the third lens group may include, in order from the object side to the image side: an eighth lens having negative refractive power; a ninth lens having positive refractive power; and a third lens unit having positive refractive power.

In some embodiments, the third lens unit may include a lens having positive refractive power, or a cemented lens formed by a tenth lens and an eleventh lens.

In some embodiments, an Abbe number of the eleventh lens may satisfy: $Vd_{11} \geq 63$.

In some embodiments, an Abbe number of the eighth lens may satisfy: $Vd_8 \geq 63$.

In some embodiments, the fourth lens group may include, in order from the object side to the image side: a twelfth lens having positive refractive power; a thirteenth lens having positive refractive power, wherein the thirteenth lens is a biconvex lens; a fourteenth lens having negative refractive power, wherein the fourteenth lens is a meniscus lens; and a fifteenth lens having positive refractive power.

In some embodiments, the fifth lens group may include: a fourth lens unit having positive refractive power.

In some embodiments, the fourth lens unit may include a lens having positive refractive power.

In some embodiments, the zoom lens further may include a splitting unit.

In some embodiments, the splitting unit may include at least two prisms, wherein two adjacent surfaces of the at least two prisms are covered by materials configured to split different wavelengths of light.

In some embodiments, the zoom lens may have two image planes for receiving light split by the splitting unit.

In some embodiments, the splitting unit is a prism, and an angle α between an incident plane and a splitting plane may satisfy: $30° \leq \alpha \leq 50°$.

In some embodiments, the splitting unit is a prism, and a light-emitting surface of the prism is vertical to an optical axis of the zoom lens.

According to another aspect of the present disclosure, an optical device is provided. The optical device may include a zoom lens according to the present disclosure.

In some embodiments, the optical device may further include an image pickup device, wherein the zoom lens may guide light from an object to the image pickup device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to zoom lenses capable of splitting light with large apertures, large target plans, and high resolutions. To this end, the zoom lenses may include sixteen optical lenses with particular shapes and structures and splitting device. The sixteen optical lenses may be arranged in a certain order from an object side to an image side. Each of the sixteen optical lenses may have a certain refractive power. The structures, parameters (e.g., a refractive index, an Abbe number, etc.) of the zoom lenses may satisfy imaging conditions. The splitting device may split light into a plurality of beams of light, each of which may be used for imaging. In this way, the zoom lenses may achieve large image planes, large apertures, and high resolutions. The imaging data of light of different wavelengths may be processed individually. In this way, the zoom lenses may have high imaging performances under low luminance, high color reductions, and good environmental adaptabilities. The zoom lenses of the present disclosure may be widely used in video surveillance fields, and especially in intelligent traffic monitoring fields.

Figure 1:
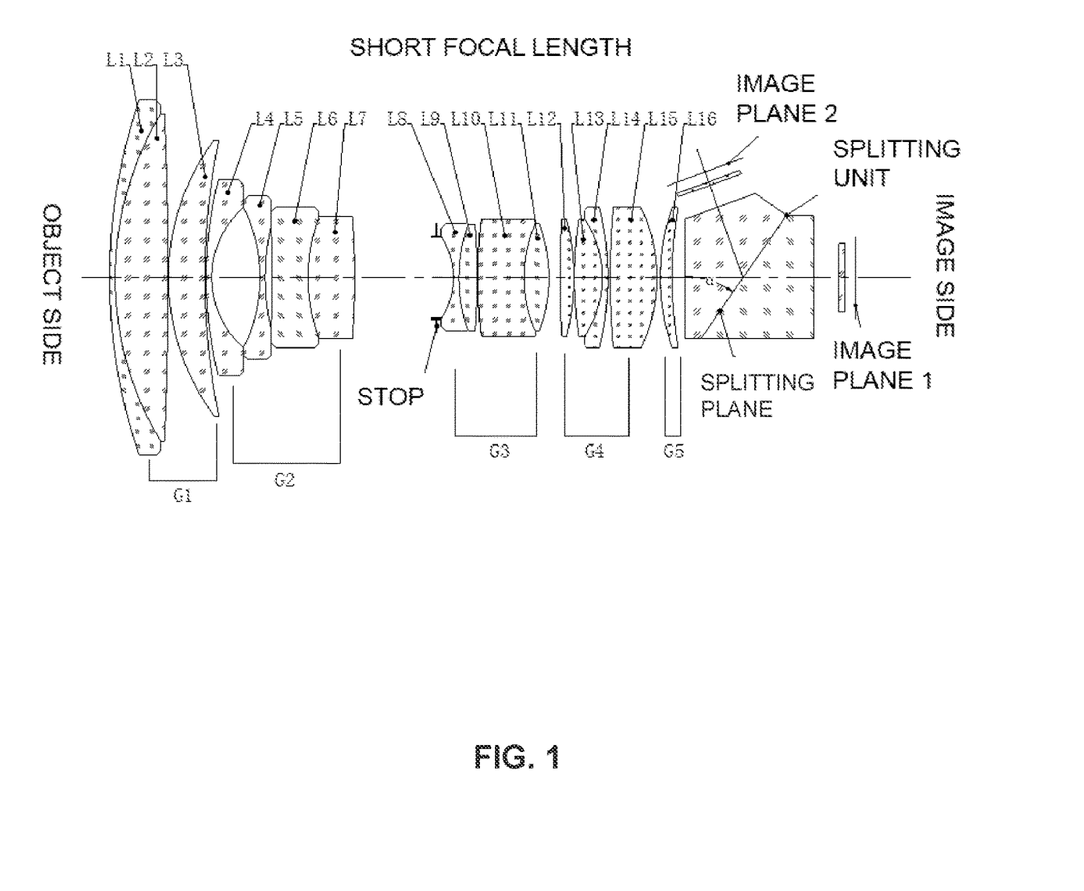
FIG. 1 is a cross-sectional view of an exemplary zoom lens at a wide angle end (short focal length) according to some embodiments of the present disclosure.

FIG. 1 is a cross-sectional view of an exemplary zoom lens at a wide angle end (short focal length) according to some embodiments of the present disclosure. In some embodiments, the zoom lens may have an object side and an image side at two ends of the zoom lens, respectively. In some embodiments, in order from the object side to the image side, the zoom lens may include a first lens group G1, a second lens group G2, an aperture stop, a third lens group G3, a fourth lens group G4, a fifth lens group G5, a splitting unit, and at least two image planes. In some embodiments, the zoom lens may satisfy the following two conditions:

$$-2.28 \leq f_2/f_{w'} \leq -1.08 \quad (1),$$

$$0.15 \leq TTL/(BFL \cdot f_{w'}) \leq 0.45 \quad (2),$$

wherein $f_2$ denotes a focal length of the second lens group G2, $f_{w'}$ denotes a focal length of the zoom lens at a wide angle end (short focal length), TTL denotes a total track length of the zoom lens, and BFL denotes a back focal length of the zoom lens.

In some embodiments, the first lens group G1 may include a plurality of lenses. For example, in order from the object side to the image side, the first lens group G1 may include a first lens L1, a second lens L2, and a first lens unit.

In some embodiments, the first lens L1 may have negative refractive power. In some embodiments, the first lens L1 may be a lens of any shape having negative refractive power. For example, as shown in FIG. 1, the first lens L1 may be a meniscus lens. The surface of the first lens L1 facing the object side may be convex, and the surface facing the image side may be concave.

In some embodiments, the second lens L2 may have positive refractive power. In some embodiments, as shown in FIG. 1, the surface of the second lens L2 facing the object side may be convex, and the surface facing the image side may be flat. In some embodiments, the first lens L1 and the second lens L2 may be cemented to form a cemented lens group.

In some embodiments, the first lens unit may include at least one third lens L3 having positive refractive power. In some embodiments, the third lens L3 may be a lens of any shape. For example, in order to reduce the size of the zoom lens, as shown in FIG. 1, the first lens unit may only include one third lens L3 having positive refractive power.

In some embodiments, the second lens group G2 may include a plurality of lenses. For example, in order from the object side to the image side, the second lens group G2 may include a fourth lens L4, a fifth lens L5, and a second lens unit.

In some embodiments, the fourth lens L4 may have negative refractive power. In some embodiments, the fourth lens L4 may be a lens of any shape. For example, as shown in FIG. 1, the fourth lens L4 may be a meniscus lens and the surface of the fourth lens L4 facing the image side may be concave.

In some embodiments, the fifth lens L5 may have negative refractive power. In some embodiments, the fifth lens L5 may be a lens of any shape. For example, as shown in FIG. 1, the fifth lens L5 may be a biconcave lens.

In some embodiments, the second lens unit may have positive refractive power. In some embodiments, the second lens unit may include a plurality of lenses. For example, the second lens unit may at least include a lens having positive refractive power. As another example, the second lens unit may be a cemented lens having positive refractive power. The cemented lens may include a sixth lens L6 having negative refractive power cemented with a seventh lens L7 having positive refractive power.

In some embodiments, the aperture stop STOP may be used to control a diameter and a position of a beam of light that enters into the zoom lens. In some embodiments, the aperture stop STOP may be between the second lens group G2 and the third lens group G3. In some embodiments, a position of the aperture stop STOP may be fixed. The size of the aperture stop STOP may be automatically adjusted to change the size of the beam of light entered into the zoom lens.

In some embodiments, the third lens group G3 may include a plurality of lenses. For example, in order from the object side to the image side, the third lens group G3 may include an eighth lens L8, a ninth lens L9, and a third lens unit.

In some embodiments, the eighth lens L8 may have negative refractive power. In some embodiments, the eighth lens L8 may be a lens of any shape having negative refractive power. For example, as shown in FIG. 1, the eighth lens L8 may be a biconcave lens. In some embodiments, in order to achieve a confocal zoom lens within a full focal length segment either in the day or in night and to achieve non-thermalization (the image photographed by the zoom lens at −40° C. to 80° C. may be clear), the eighth lens L8 may be made up of low dispersion materials. In some embodiments, an Abbe number of the eighth lens L8 satisfies $Vd_8 \geq 63$ in order to reduce the image aberration and improve the image quality. For example, the Abbe number of the eighth lens L8 may be 65, 68, 70, etc.

In some embodiments, the ninth lens L9 may have positive refractive power. In some embodiments, the ninth lens L9 may be a lens of any shape having positive refractive power. For example, as shown in FIG. 1, the ninth lens L9 may be a biconvex lens. In some embodiments, in order to reduce the size of the zoom lens, as shown in FIG. 1, the eighth lens L8 and the ninth lens L9 may be cemented to form a cemented lens group.

In some embodiments, the third lens unit may have positive refractive power. In some embodiments, the third lens unit may include a plurality of lenses. For example, the third lens unit may include a lens having positive refractive power. As another example, the third lens unit may include a tenth lens L10 having negative refractive power and an eleventh lens L11 having positive refractive power. In some embodiments, the eleventh lens L11 may be a biconvex lens. In some embodiments, the tenth lens L10 may be cemented with the eleventh lens L11 to form a cemented lens group. In some embodiments, in order to achieve a confocal zoom lens within a full focal length segment either in the day or at night and to achieve non-thermalization (the image captured by the zoom lens may be clear photographed at −40° C. to 80° C.), the eleventh lens L11 may be made up of low dispersion materials. In some embodiments, an Abbe number of the eleventh lens L11 satisfies $Vd_{11} \geq 63$ in order to reduce the image aberration and improve the image quality. For example, the Abbe number of the eleventh lens L11 may be 65, 68, 70, etc. In some embodiments, the Abbe number of the eighth lens L8 and the eleventh lens L11 may be the same or different.

In some embodiments, the fourth lens group G4 may include a plurality of lenses. For example, in order from the object side to the image side, the fourth lens group G4 may include a twelfth lens L12, a thirteenth lens L13, a fourteenth lens L14, and a fifteenth lens L15.

In some embodiments, the twelfth lens L12 may have positive refractive power. In some embodiments, the twelfth lens L12 may be a lens of any shape having positive refractive power. For example, as shown in FIG. 1, the surface of the twelfth lens L12 facing the image side may be convex.

In some embodiments, the thirteenth lens L13 may have positive refractive power. In some embodiments, the thirteenth lens L13 may be a biconvex lens.

In some embodiments, the fourteenth lens L14 may have negative refractive power. In some embodiments, the fourteenth lens L14 may be a meniscus lens and the surface of the fourteenth lens L14 facing the image side may be convex. In some embodiments, the thirteenth lens L13 may be cemented with the fourteenth lens L14 to form a cemented lens group.

In some embodiments, the fifteenth lens L15 may have positive refractive power. In some embodiments, the fifteenth lens L15 may be a lens of any shape having positive refractive power. For example, as shown in FIG. 1, the surface of the fifteenth lens L15 facing the image side may be convex.

In some embodiments, the fifth lens group G5 may include a plurality of lenses. For example, the fifth lens group G5 may at least include a sixteenth lens L16. As another example, in order to reduce the size of the zoom lens, the fifth lens group G5 may include only one sixteenth lens L16 having positive refractive power.

In some embodiments, the splitting unit may be used for splitting different wavelengths of light. For example, the splitting unit may include at least two prisms. Two adjacent surfaces of the at least two prisms may be covered by materials configured to split different wavelengths of light. For example, the materials configured to split different wavelengths of light may be coating films, such as metallic coating films, dichroic optical coating films, or the like, or any combination thereof. In some embodiments, the splitting unit may be between the fifth lens group G5 and the at least two image planes. For example, a light-emitting side may have a corresponding image plane for receiving light split by the splitting unit. In some embodiments, a filter may be placed between each prism and the corresponding image plane. The filter may be used for selecting light of a certain wavelength.

In some embodiments, in order to split visible light and infrared light, as shown in FIG. 1, the splitting unit may include two prisms. Two adjacent surfaces of the two prisms may be covered by materials configured to split different wavelengths of light. In some embodiments, the materials may be determined according to the demands of a user. For example, the materials may be a coating film that transmits the infrared light and reflects the visible light. As another example, the materials may be a coating film that transmits yellow light and reflects light of other colors. In some embodiments, each of the two prisms may be connected with an imaging chip, respectively. The imaging chip may include a complementary metal-oxide-semiconductor (CMOS) chip, a charge-coupled device (CCD), or the like, or any combination thereof. The imaging chip may receive images of the visible light and the infrared light, respectively. In some embodiments, the images of the visible light and the infrared light may be fused according to an image fusion algorithm. In this way, under low luminance, the visible light and the infrared light may be combined to supplement light for the scene to improve the image quality of the scene. In some embodiments, such zoom lens may avoid using strong white flashlights to dazzle drivers or pedestrians.

In some embodiments, the splitting unit may include a prism. In some embodiments, an angle α between an incident plane and a splitting plane of the prism may satisfy 30°≤α≤50°. In some embodiments, the splitting unit may include at least two prisms. The angle α between each incident plane and the corresponding splitting plane of each prism may satisfy 30°≤α≤50°. In some embodiments, if the angle between the incident plane and the splitting plane is less than 30°, the light reflected from the prism may enter into the fifth lens group G5. As a result, the corresponding filter and the image plane may have no place to be placed, and the manufacturability of the zoom lens may be difficult. In some embodiments, an angle between the incident plane and the splitting plane greater than 50° may result in a low reflectivity, a low utilization ratio, and a low image luminance. In order to take the manufacturability and the image quality, the angle α between each incident plane and the corresponding splitting plane may be not less than 30° and not great than 50°.

In some embodiments, a light-emitting surface of the prism may be vertical to an optical axis of the zoom lens. In some embodiments, the light emitting from the prism may be vertical to the corresponding image plane to improve the reflectivity, the utilization ratio, and the image luminance.

Figure 2:
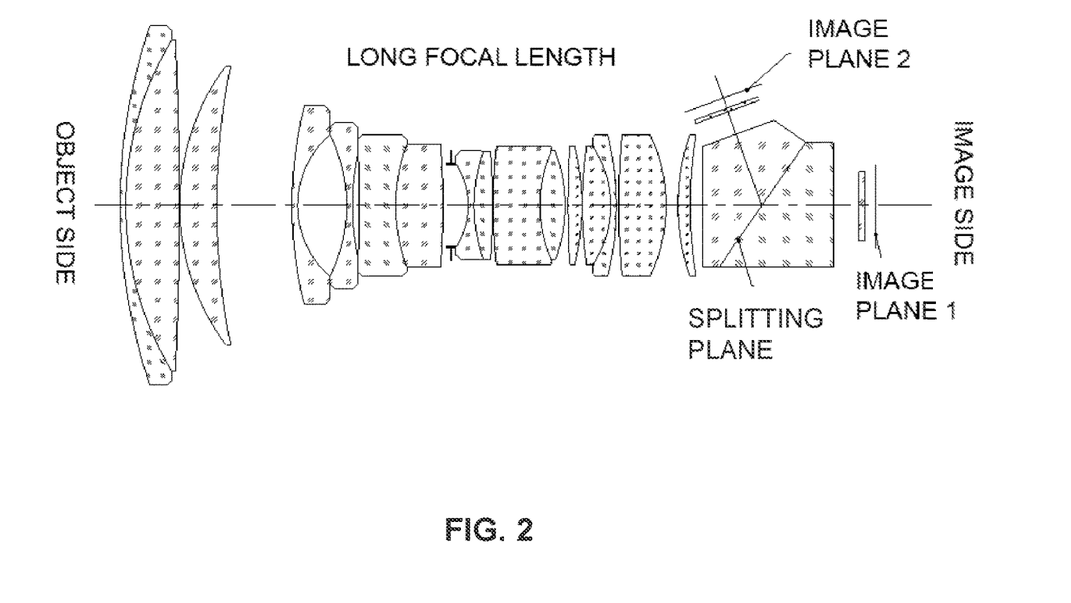
FIG. 2 is a cross-sectional view of an exemplary zoom lens at a telephoto end (long focal length) according to some embodiments of the present disclosure.

FIG. 2 is a cross-sectional view of an exemplary zoom lens at a telephoto end (long focal length) according to some embodiments of the present disclosure. In some embodiments, at least one of the five lens groups of the zoom lens may be movable to change the focal lengths of the zoom lens. For example, as shown in FIG. 1 and FIG. 2, the first lens group G1, the third lens group G3, and the fifth lens group G5 may be fixed, and the second lens group G2 and the fourth lens group G4 may be movable. For example, when changing focal lengths of the zoom lens, the second lens group G2 may be movable between the first lens group G1 and the third lens group G3 along the axis of the zoom lens. As another example, the fourth lens group G4 may be movable between the third lens group G3 and the fifth lens group G5 along the axis of the zoom lens. In some embodiments, both the second lens group G2 and the fourth lens group G4 may be moved along the axis of the zoom lens to change the focal length of the zoom lens. In some embodiments, only one of the second lens group G2 and the fourth lens group G4 may be moved along the axis of the zoom lens to change the focal length of the zoom lens.

In some embodiments, materials of the lenses of the zoom lens may include glass, plastic (e.g., PC, PMMA, etc.), quartz, crystal, or the like, or any combination thereof. For example, all of the sixteen lenses may be made up of glass. As another example, all of the sixteen lenses may be made up of plastic. As still another example, one or some of the sixteen lenses may be made up of glass, and others of the sixteen lenses may be made up of plastic.

In some embodiments, the zoom lens may have a plurality of parameters. For example, each surface of a lens in the zoom lens may have a radius of curvature R. As another example, a center thickness T may refer as a distance between two center points of two adjacent surfaces in the zoom lens. As still another example, each lens in the zoom lens may have a refractive index nd and an Abbe number Vd. In some embodiments, the radius of curvature R, the center thickness T the refractive index nd, and the Abbe number Vd of each lens of the zoom lens may satisfy the conditions as shown in the following TAB. 1.

TABLE 1

| Surface Number | Radius of Curvature R(mm) | Center Thickness T(mm) | Refractive Index nd | Abbe Number Vd |
|---|---|---|---|---|
| 1 | 117.44 | 1.2 | 1.946 | 17.98 |
| 2 | 67.99 | 11.32 | 1.593 | 68.62 |
| 3 | −785.85 | 0.1 | | |
| 4 | 49.44 | 7.81 | 1.782 | 37.09 |
| 5 | 148.63 | 0.26(W) | | |
| | | 16.05(T) | | |
| 6 | 85.35 | 1.2 | 1.834 | 37.35 |
| 7 | 19.82 | 10.37 | | |
| 8 | −33.25 | 1.2 | 1.593 | 68.62 |
| 9 | 50.09 | 1.47 | | |
| 10 | −293.28 | 7.72 | 1.639 | 55.47 |
| 11 | 36.84 | 10 | 2.001 | 29.13 |
| 12 | −169.46 | 18.59(W) | | |
| | | 2.8(T) | | |
| STOP | Infinity | 2.55 | | |
| 14 | −16.02 | 1.2 | 1.497 | 81.6 |
| 15 | 33.74 | 3.93 | 1.946 | 17.98 |
| 16 | −143.2 | 0.1 | | |
| 17 | 109.58 | 10 | 1.946 | 17.98 |
| 18 | 28.14 | 5.36 | 1.497 | 81.61 |
| 19 | −32.31 | 2.4(W) | | |
| | | 0.6(T) | | |
| 20 | 217.03 | 2.95 | 1.593 | 68.62 |
| 21 | −50.94 | 0.1 | | |
| 22 | 83.13 | 5.99 | 1.437 | 95.1 |
| 23 | −22.31 | 1.2 | 2.001 | 25.46 |
| 24 | −60.85 | 0.52 | | |
| 25 | 165.15 | 10 | 1.593 | 68.62 |
| 26 | −34.52 | 0.7(W) | | |
| | | 2.5(T) | | |
| 27 | 45.18 | 2.17 | 1.946 | 17.98 |
| 28 | 65.48 | 3 | | |
| 29 | Infinity | 29 | 1.517 | 64.21 |
| 30 | Infinity | 7.797 | | |
| IMA | Infinity | | | |

Wherein the surface number denotes a number of a surface of a lens in sequence from the object side to the image side. For example, as shown in FIG. 1 and FIG. 2, the surface number 1 may refer to the surface of the first lens L1 facing the object side. As another example, the surface number 2 may refer to the cemented surface of the first lens L1 and the second lens L2. As still another example, the surface number STOP and IMA may refer to the surface of the aperture stop and the image plane, respectively.

In some embodiments, each lens in the zoom lens may be designed according to the parameters as shown in TAB. 1. Taking the first lens L1 for example, the radius of curvature R of the surface of the first lens L1 facing the object side (the surface number 1) is 117.44 mm, the center thickness T between the surface of the first lens L1 facing the object side (the surface number 1) and the surface of the first lens L1 facing the image side (the surface number 2) of the first lens L1 is 1.2, the refractive index nd of the surface number 1 is 1.946, and the Abbe number vd of the surface number 1 is 17.98. The radius of curvature R of the surface of the first lens L1 facing the image side (the surface number 2) is 67.99 mm, the refractive index nd of the surface number 2 is 1.593, and the Abbe number vd of the surface number 1 is 68.62. As shown in FIG. 1, the first lens L1 is cemented to the second lens L2 to form the cemented lens group, so the radius of curvature R, the refractive index nd, and the Abbe number Vd of the surface of the second lens L2 facing the object side (the surface number 2) are the same as that of the surface of the first lens L1 facing the image side (the surface number 2), respectively.

The word "W" in TAB. 1 denotes a short focal length (at wide angle end) state, and the word "T" denotes a long focal length (at telephoto end) state. For example, under the short focal length (at wide angle end) state, the distance between the surface of the third lens L3 facing the image side and the surface of the fourth lens L4 facing the object side is 0.26 mm. As another example, under the long focal length (at telephoto end) state, the surface of the third lens L3 facing the image side and the surface of the fourth lens L4 facing the object side is 16.05 mm.

It should be noted that the conditions in TAB. 1 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

According to the zoom lens described in the present disclosure, the total track length TTL of the zoom lens may satisfy TTL≤160 mm. The focal length $f_w$, at the wide angle end (short focal length) may be 12 mm, and the focal length $f_w$, at the telephoto end (long focal length) may be 25 mm. The field angle of the zoom lens at the wide angle end (short focal length) may be 72°, and the field angle of the zoom lens at the telephoto end (long focal length) may be 38.1°. The field angle of the zoom lens may be between 38.1° and 72°. The optical distortion of the zoom lens may be −8%. The aperture FNO of the zoom lens may be F1.4. The size of the target plane of the zoom lens may be 1.1" (≥Φ17.6 mm).

Figure 3:
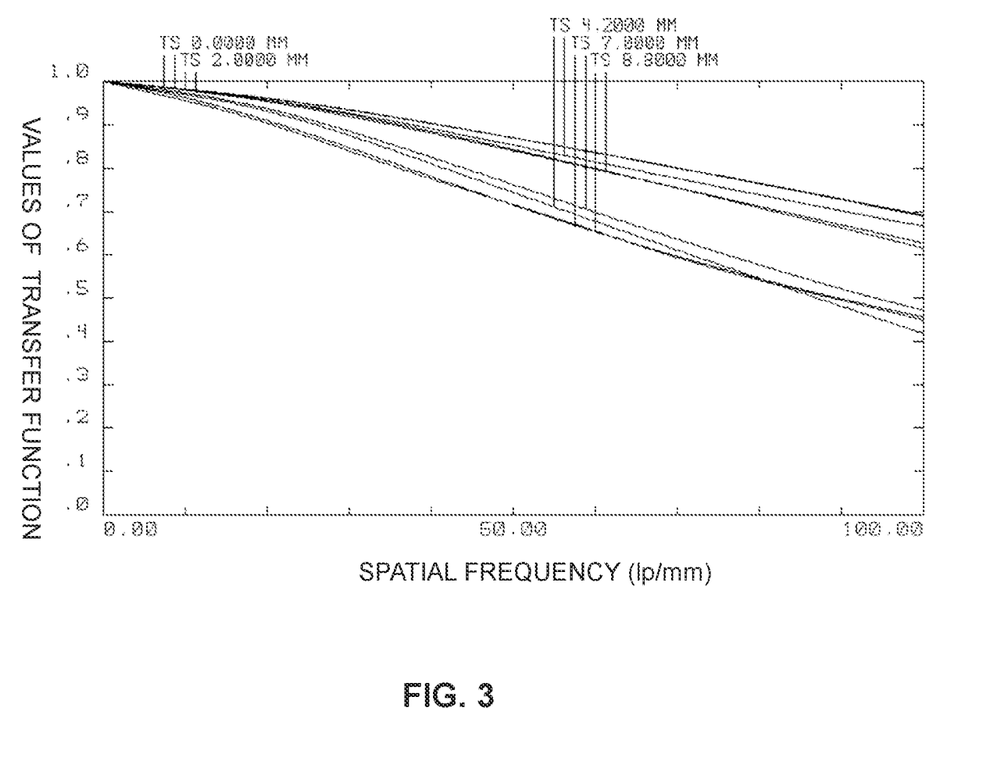
FIG. 3 is a diagram illustrating an exemplary modulation transfer function (MTF) of a zoom lens at a wide angle end (short focal length) according to some embodiments of the present disclosure.

FIG. 3 is a diagram illustrating an exemplary modulation transfer function (MTF) of a zoom lens at a wide angle end (short focal length) according to some embodiments of the present disclosure. In some embodiments, the MTF may be used to evaluate imaging qualities of a zoom lens. For example, the higher and smoother of the curve of the MTF, the higher imaging quality of the zoom lens. The aberrations, such as spherical aberration, the coma, the astigmatism, the field curvature, the lateral chromatic aberration, the axial chromatic aberration, etc., may be well calibrated. As shown in FIG. 3, the curve of the MTF of visible light at the wide angle end (short focal length) of the zoom lens is smooth and concentrated. The average value of the MTF of a full field (a half image height Y'=8.8 mm) may be greater than 0.55.

Figure 4:
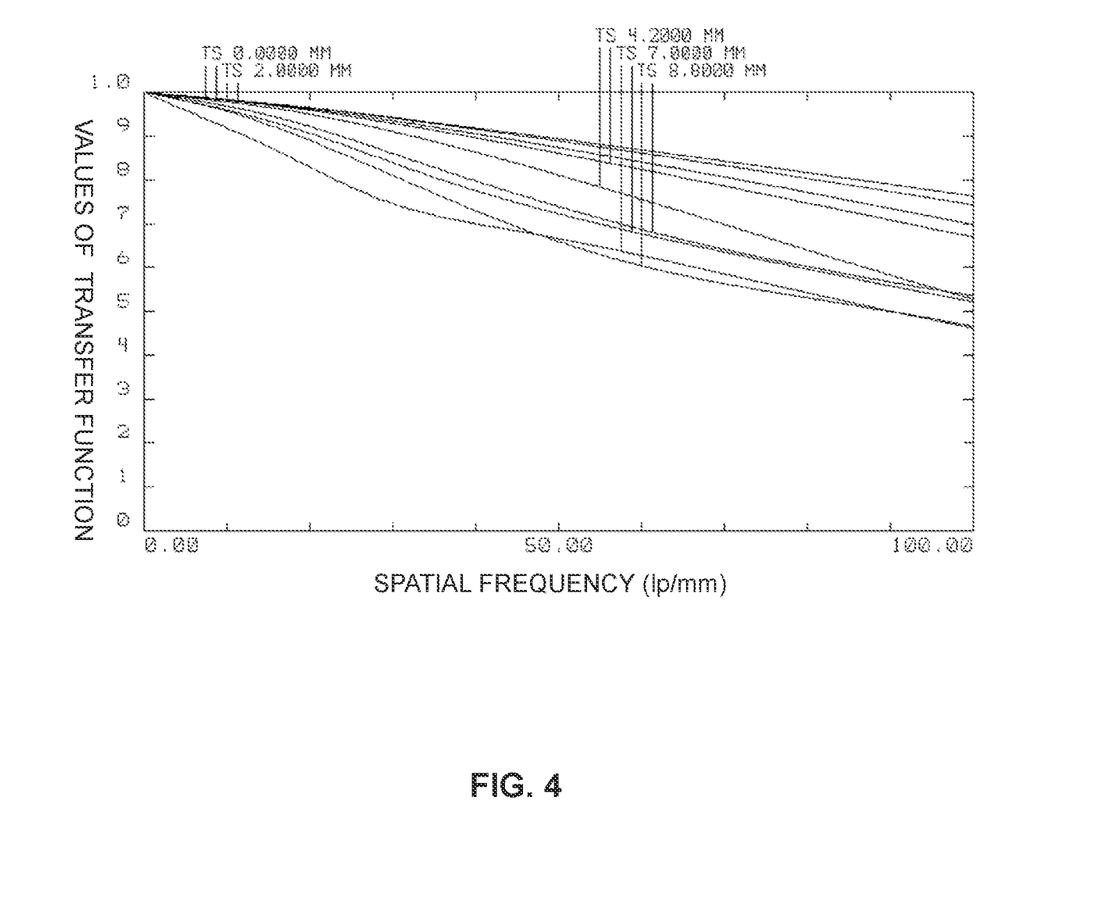
FIG. 4 is a diagram illustrating an exemplary modulation transfer function (MTF) of a zoom lens at a telephoto end (long focal length) according to some embodiments of the present disclosure.

FIG. 4 is a diagram illustrating an exemplary modulation transfer function (MTF) of a zoom lens at a telephoto end (long focal length) according to some embodiments of the present disclosure. As shown in FIG. 4, the curve of the MTF of visible light at the telephoto end (long focal length) of the zoom lens is smooth and concentrated. The average value of the MTF of the full field (the half image height Y'=8.8 mm) may be greater than 0.55. According to the zoom lens of the present disclosure, the resolution of the zoom lens is high, the target plane is 1.1", and the zoom lens satisfies 700 megapixels.

In some embodiments, another aspect of the present disclosure relates to optical devices having the zoom lenses described in the present disclosure. For example, an optical device may include a zoom lens according to the present disclosure and an image pickup device. In some embodiments, the image pickup device may be at the image plane of the zoom lens. In some embodiments, the zoom lens may guide light from an object at the object side of the zoom lens to the image pickup device. In some embodiments, the image pickup device may convert an object image into electrical signals. For example, the image pickup device may include a CCD sensor, a CMOS sensor, or the like, or any combination thereof. In some embodiments, the optical device may include the zoom lens according to the present disclosure and a plurality of image pickup devices. Each of the plurality of image pickup devices may be placed at an image plane of the zoom lens. In some embodiments, the images obtained from the plurality of image pickup devices may be processed respectively or may be fused.

In some embodiments, the optical device may be any electronic device that is capable of capturing images or videos. For example, the optical device may include an image sensor, a video recorder, or the like, or any combination thereof. In some embodiments, the optical device may include any suitable types of camera, such as a fixed camera, a fixed dome camera, a covert camera, a Pan-Tilt-Zoom (PTZ) camera, a thermal camera, or the like, or any combination thereof. In some embodiments, the optical device may be implemented on a computing device or a mobile device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A zoom lens comprising, in order from an object side to an image side:
   a first lens group;
   a second lens group;
   a third lens group;
   a fourth lens group; and
   a fifth lens group;
   wherein the zoom lens satisfies the following conditions:

$-2.28 \leq f_2/f_w \leq -1.08$ $0.15/\text{mm} \leq \text{TTL}/(\text{BFL}*f_{w'}) \leq 0.45/\text{mm}$ wherein $f_2$ denotes a focal length of the second lens group, $f_{w'}$ denotes a focal length of the zoom lens at a wide angle end, TTL denotes a total track length of the zoom lens, and BFL denotes a back focal length of the zoom lens,
   wherein
   the first lens group includes, in order from the object side to the image side:
   a first lens having negative refractive power;
   a second lens having positive refractive power; and
   a first lens unit having positive refractive power, wherein the first lens unit includes a third lens having positive refractive power;
   the second lens group includes, in order from the object side to the image side:

a fourth lens having negative refractive power;
a fifth lens having negative refractive power; and
a second lens unit having positive refractive power; and
the third lens group includes, in order from the object side to the image side:
a sixth lens having negative refractive power;
seventh lens having positive refractive power; and
a third lens unit having positive refractive power.

2. The zoom lens of claim 1, wherein positions of the first lens group, the third lens group, and the fifth lens group are fixed, and the second lens group and the fourth lens group are movable along an optical axis of the zoom lens.

3. The zoom lens of claim 1, wherein the second lens unit includes a lens having positive refractive power or a cemented lens having positive refractive power.

4. The zoom lens of claim 1, wherein the third lens unit includes a lens having positive refractive power, or a cemented lens formed by an eighth lens and a ninth lens.

5. The zoom lens of claim 4, wherein an Abbe number of the ninth lens satisfies: $Vd_{11} \geq 63$.

6. The zoom lens of claim 4, wherein the fourth lens group includes, in order from the object side to the image side:
tenth lens having positive refractive power;
an eleventh lens having positive refractive power, wherein the eleventh lens is a biconvex lens;
twelfth lens having negative refractive power, wherein the twelfth lens is a meniscus lens; and
thirteenth lens having positive refractive power.

7. The zoom lens of claim 1, wherein an Abbe number of the sixth lens satisfies: $Vd_8 \geq 63$.

8. The zoom lens of claim 1, wherein the fifth lens group includes:
a fourth lens unit having positive refractive power.

9. The zoom lens of claim 8, wherein the fourth lens unit includes a lens having positive refractive power.

10. The zoom lens of claim 1, further comprising a splitting unit.

11. The zoom lens of claim 10, wherein the splitting unit includes at least two prisms, wherein two adjacent surfaces of the at least two prisms are covered by materials configured to split different wavelengths of light.

12. The zoom lens of claim 10, having two image planes for receiving light split by the splitting unit.

13. The zoom lens of claim 10, wherein the splitting unit is a prism, and an angle α between an incident plane and a splitting plane satisfies: $30° \leq \alpha \leq 50°$.

14. The zoom lens of claim 10, wherein the splitting unit is a prism, and a light-emitting surface of the prism is vertical to an optical axis of the zoom lens.

15. An optical device, comprising: a zoom lens, wherein the zoom lens includes, in order from an object side to an image side:
a first lens group;
a second lens group;
a third lens group;
a fourth lens group; and
a fifth lens group; wherein the zoom lens satisfies the following conditions:

$-2.28 \leq f_2/f_w \leq -1.08$ $0.15/\text{mm} \leq TTL/(BFL * f_{w'}) \leq 0.45/\text{mm}$ wherein $f_2$ denotes a focal length of the second lens group, $f_{w'}$ denotes a focal length of the zoom lens at a wide angle end, TTL denotes a total track length of the zoom lens, and BFL denotes a back focal length of the zoom lens, wherein the first lens group includes, in order from the object side to the image side:
a first lens having negative refractive power;
a second lens having positive refractive power; and
a first lens unit having positive refractive power, wherein the first lens unit includes a third lens having positive refractive power;
the second lens group includes, in order from the object side to the image side:
a fourth lens having negative refractive power;
a fifth lens having negative refractive power; and
a second lens unit having positive refractive power; and
the third lens group includes, in order from the object side to the image side:
a sixth lens having negative refractive power;
seventh lens having positive refractive power; and
a third lens unit having positive refractive power.

16. The optical device of claim 15, further comprising:
an image pickup device, wherein the zoom lens guides light from an object to the image pickup device.

17. The optical device of claim 15, wherein positions of the first lens group, the third lens group, and the fifth lens group are fixed, and the second lens group and the fourth lens group are movable along an optical axis of the zoom lens.

18. The optical device of claim 15, wherein the second lens unit includes a lens having positive refractive power or a cemented lens having positive refractive power.

19. The optical device of claim 15, wherein the third lens unit includes a lens having positive refractive power, or a cemented lens formed by an eighth lens and a ninth lens.

20. The optical device of claim 15, wherein an Abbe number of the sixth lens satisfies: $Vd_8 \geq 63$.

* * * * *